United States Patent
Levy et al.

(10) Patent No.: US 9,954,771 B1
(45) Date of Patent: Apr. 24, 2018

(54) PACKET DISTRIBUTION WITH PREFETCH IN A PARALLEL PROCESSING NETWORK DEVICE

(71) Applicant: Marvell Israel (M.I.S.L) Ltd., Yokneam (IL)

(72) Inventors: Gil Levy, Hod Hasharon (IL); Itay Peled, Hagor (IL); Galia Peleg, Tel Aviv-Jaffa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 34 days.

(21) Appl. No.: 14/610,834

(22) Filed: Jan. 30, 2015

(51) Int. Cl.
G06F 9/46 (2006.01)
H04L 12/721 (2013.01)
H04L 12/935 (2013.01)
H04L 12/715 (2013.01)

(52) U.S. Cl.
CPC .............. H04L 45/44 (2013.01); H04L 45/46 (2013.01); H04L 49/3018 (2013.01); H04L 49/3063 (2013.01)

(58) Field of Classification Search
CPC ....................................................... H04L 45/44
See application file for complete search history.

(56) References Cited

U.S. PATENT DOCUMENTS

| | | | | |
|---|---|---|---|---|
| 4,663,706 A * | 5/1987 | Allen | ................ | G06F 15/17337 370/403 |
| 5,764,895 A | 6/1998 | Chung | | |
| 5,881,308 A * | 3/1999 | Dwyer, III | .......... | G06F 9/30072 712/215 |
| 5,926,458 A * | 7/1999 | Yin | ...................... | H04L 12/5693 370/230 |
| 6,084,856 A * | 7/2000 | Simmons | .............. | H04L 49/351 370/235 |
| 6,122,274 A * | 9/2000 | Kumar | ................ | H04L 12/5601 370/388 |
| 6,246,680 B1 * | 6/2001 | Muller | .................. | H04L 49/602 370/389 |
| 6,345,041 B1 * | 2/2002 | Kimball | ................ | H04L 41/046 370/235 |

(Continued)

FOREIGN PATENT DOCUMENTS

WO  WO-99/07180 A2  2/1999

OTHER PUBLICATIONS

U.S. Appl. No. 14/574,088, Levy et al., "Increasing Packet Processing Rate in a Network Device," filed Dec. 17, 2014.

(Continued)

Primary Examiner — Parth Patel (57) ABSTRACT

A packet processing system comprises a plurality of packet processing nodes configured to process packets. The packet processing nodes are arranged in a plurality of packet processing clusters. The packet processing system also includes a plurality of prefetch buffers respectively associated with different ones of the packet processing clusters. A first prefetch buffer of the plurality of prefetch buffers is associated with a first packet processing cluster and is configured to store packets distributed for processing to the first packet processing cluster when the first packet processing clusters does not include any packet processing nodes available for processing of the packets.

32 Claims, 5 Drawing Sheets

(56) References Cited

U.S. PATENT DOCUMENTS

| | | | | |
|---|---|---|---|---|
| 7,190,667 | B2* | 3/2007 | Susnow | H04L 12/5693 370/229 |
| 7,245,623 | B1* | 7/2007 | Cheriton | H04L 49/90 370/393 |
| 7,395,538 | B1* | 7/2008 | Carney | H04L 67/1002 712/1 |
| 7,738,443 | B2* | 6/2010 | Kumar | H04L 12/1854 370/351 |
| 7,765,328 | B2* | 7/2010 | Bryers | H04L 29/06 709/220 |
| 7,864,764 | B1 | 1/2011 | Ma et al. | |
| 7,924,860 | B1* | 4/2011 | Frailong | H04L 49/552 370/413 |
| 8,111,690 | B2* | 2/2012 | Hussain | H04L 45/00 370/389 |
| 8,155,134 | B2* | 4/2012 | Fairhurst | H04L 49/90 370/235 |
| 8,310,927 | B1 | 11/2012 | Cohen | |
| 8,670,454 | B2* | 3/2014 | Olesinski | H04L 49/3018 365/189.05 |
| 8,861,527 | B1* | 10/2014 | Bao | H04L 12/1836 370/392 |
| 2002/0095498 | A1* | 7/2002 | Chanda | H04L 12/2889 709/225 |
| 2002/0123989 | A1* | 9/2002 | Kopelman | G06F 17/30675 |
| 2002/0186656 | A1* | 12/2002 | Vu | H04L 49/1576 370/229 |
| 2003/0139178 | A1* | 7/2003 | Uesugi | H04J 13/00 455/422.1 |
| 2004/0139071 | A1* | 7/2004 | Lee | G06F 17/30952 |
| 2005/0083943 | A1* | 4/2005 | Lee | H04L 47/10 370/395.4 |
| 2005/0223139 | A1* | 10/2005 | Wagh | G06F 13/4059 710/52 |
| 2006/0059312 | A1* | 3/2006 | Peled | G06F 12/0862 711/137 |
| 2006/0182116 | A1* | 8/2006 | Shin | H04L 12/2805 370/395.5 |
| 2006/0239194 | A1 | 10/2006 | Chapell | |
| 2008/0114887 | A1 | 5/2008 | Bryers et al. | |
| 2008/0317024 | A1* | 12/2008 | Rygh | G06F 11/30 370/389 |
| 2009/0016354 | A1* | 1/2009 | Isobe | H04L 49/90 370/395.4 |
| 2009/0296580 | A1 | 12/2009 | Williams, Jr. et al. | |
| 2010/0325366 | A1* | 12/2010 | Zamsky | G06F 9/3834 711/142 |
| 2011/0235504 | A1* | 9/2011 | Nozaki | H04L 45/04 370/221 |
| 2012/0002546 | A1 | 1/2012 | Sundararaman et al. | |
| 2012/0177047 | A1* | 7/2012 | Roitshtein | H04L 69/22 370/392 |
| 2012/0324090 | A1* | 12/2012 | Gu | H04L 67/104 709/223 |
| 2013/0070584 | A1 | 3/2013 | Hutchison et al. | |
| 2013/0176988 | A1* | 7/2013 | Wang | H04W 28/08 370/331 |
| 2013/0346645 | A1* | 12/2013 | Mayhew | G06F 15/167 710/52 |
| 2014/0029449 | A1 | 1/2014 | Xu et al. | |
| 2014/0140228 | A1* | 5/2014 | Dayanandan | H04L 69/324 370/252 |
| 2014/0169378 | A1* | 6/2014 | Shumsky | H04L 49/552 370/394 |
| 2014/0177470 | A1* | 6/2014 | Roitshtein | H04L 41/083 370/254 |
| 2014/0192815 | A1* | 7/2014 | Shumsky | H04L 47/6215 370/394 |
| 2014/0215144 | A1* | 7/2014 | Valency | H04L 49/90 711/108 |
| 2014/0226476 | A1* | 8/2014 | Bertze | H04L 47/30 370/230.1 |
| 2014/0237481 | A1* | 8/2014 | Sandstrom | G06F 9/505 718/105 |
| 2015/0058404 | A1* | 2/2015 | Agrawal | H04L 67/1008 709/203 |
| 2015/0110113 | A1* | 4/2015 | Levy | H04L 45/745 370/392 |
| 2015/0113190 | A1* | 4/2015 | Wohlgemuth | H04L 45/74 710/200 |
| 2015/0127699 | A1* | 5/2015 | Leggette | H04L 67/1097 709/201 |
| 2015/0172188 | A1* | 6/2015 | Levy | H04L 45/74 370/392 |
| 2015/0222644 | A1* | 8/2015 | Szydlo | H04L 41/0813 726/22 |
| 2016/0179618 | A1* | 6/2016 | Resch | H04L 63/101 714/764 |
| 2016/0205025 | A1* | 7/2016 | Wakabayashi | H04L 47/2416 370/235 |

OTHER PUBLICATIONS

Shpiner et al., "Reducing the Reordering Delay in Multi-Core Network Processors," Technical Report TR12-01, Comnet, Technion, Israel.

U.S. Appl. No. 14/092,521, filed Nov. 27, 2013.
U.S. Appl. No. 14/482,980, filed Sep. 10, 2014.
U.S. Appl. No. 14/516,529, filed Oct. 16, 2014.
U.S. Appl. No. 14/516,500, filed Oct. 16, 2014.

* cited by examiner

PACKET DISTRIBUTION WITH PREFETCH IN A PARALLEL PROCESSING NETWORK DEVICE

CROSS-REFERENCE TO RELATED APPLICATION

This disclosure claims the benefit of U.S. Provisional Patent Application No. 61/934,455, filed Jan. 31, 2014, entitled "Distribution with pre fetching in run to completion processing architecture," the disclosure of which is hereby expressly incorporated herein by reference in its entirety.

FIELD OF THE DISCLOSURE

The present disclosure relates generally to network devices such as switches, routers, and edge devices, and more particularly to systems and methods for processing communication packets in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network devices, such as network switches, bridges, routers, etc., employ multiple packet processing elements to simultaneously process multiple packets to provide high throughput. For example, a network device may utilize parallel packet processing in which multiple packet processing elements simultaneously and in parallel perform processing of different packets. In other network devices, a pipeline architecture employs sequentially arranged packet processing elements such that different packet processing elements in the pipeline may be processing different packets at a given time.

SUMMARY

In an embodiment, a packet processing system comprises a plurality of packet processing nodes configured to process packets, the packet processing nodes arranged in a plurality of packet processing clusters. The packet processing system also comprises a plurality of prefetch buffers, ones of prefetch buffers respectively associated with different ones of the packet processing clusters. A first prefetch buffer of the plurality of prefetch buffers is associated with a first packet processing cluster and is configured to store packets distributed for processing to the first packet processing cluster when the first packet processing clusters does not include any packet processing nodes available for processing of the packets.

In another embodiment, a method for processing packets in a network device includes receiving a plurality of packets, including at least a first packet, at an ingress port of the network device, wherein the network device includes a plurality of packet processing nodes configured to process the packets, the packet processing nodes arranged in a plurality of packet processing clusters. The method also includes distributing, by a global distributor of the network device, the packets to the packet processing clusters for processing of the packets, including distributing the first packet to a first packet processing cluster of the plurality of packet processing clusters, wherein the packet processing clusters are respectively associated with ones of a plurality of prefetch buffers, the prefetch buffers configured to store packets when the associated packet processing clusters do not include any packet processing nodes available for processing of the packets.

In yet another embodiment, a packet processing system comprises a plurality of packet processing nodes configured to process packets, the packet processing nodes arranged in a plurality of packet processing clusters. The packet processing system also comprises a global distributor configured to distribute packets for processing to the packet processing clusters, is the global distributor comprising a distribution controller configured to select packet processing clusters to which to distribute a packet based on one or both of (i) respective available processor indications indicative of whether ones of the packet processing clusters include packet processing nodes available for processing of the packet and (ii) respective buffer space indications indicative of availability of buffer space in respective prefetch buffers associated with ones of the packet processing clusters.

In still another embodiment, a method for processing packets in a network device includes receiving packets at the network device, wherein the network device includes a plurality of packet processing nodes, the packet processing nodes arranged in a plurality of packet processing clusters. The method also includes distributing the packets to the plurality of packet processing clusters for processing of the packets, including distributing the packets based on one or both of (i) respective available processor indications indicative of whether ones of the packet processing clusters include packet processing nodes available for processing of the packets and (ii) respective buffer space indications indicative of availability of buffer space in respective prefetch buffers associated with ones of the packet processing clusters.

DETAILED DESCRIPTION

In embodiments described below, a distributor of a network device (e.g., a bridge device, router device, switch device, or any other suitable network device) distributes processing of packets among a plurality of packet processing nodes, included in the network device, for processing of the packets. The packet processing nodes operate to concurrently, in parallel, perform processing of packets, and each packet processing node is configured to perform all necessary processing operations ("run-to-completion") to fully process a packet, according to an embodiment. Different packets received by the network device may require different processing times and/or different sets of processing operations to be fully processed by the packet processing nodes of the network device, in at least some embodiments and/or scenarios. In an embodiment, ones of the packet processing nodes are mutually identical with the other ones of the packet processing nodes. For example, ones of packet processing nodes are configured to perform same sets of processing operations to fully process various packets. In at least some embodiments, each of the packet processing nodes is configured to perform different sets of processing operations to process different types of packets.

In some embodiments, the packet processing nodes are programmable processors, such as processors configured to execute computer readable instructions stored in a non-transitory memory. In other embodiments, the packet processing nodes are implemented using application-specific integrated circuits (ASICs) or other suitable hardware components. In an embodiment, the packet processing nodes operate asynchronously to individually process packets, which results in collisions of processing operations that require the packet processing nodes to utilize shared resources, such as access to shared memory, for example, in some situations. As a result, even if processing of two packets is initiated at two respective packet processing nodes simultaneously, and the same processing operations are performed at the respective processing nodes to process the packets, processing of the packets is completed by the packet processing nodes at different times, in at least some situations. Further, packets are received by the network device at different rates during different period of time, due to burstiness of internet traffic, for example, in at least some embodiments and/or scenarios.

Bursty traffic entering the network device, and variance processing times of packets by the packet processing nodes of the network device, results in bursty availability of packet processing nodes to accept new packets, in an embodiment. For example, in some situations, there are no packet processing nodes available to initiate processing of new packets, for example when all of the packet processing nodes are currently processing other packets. On the other hand, in other situations, many packet processing nodes are concurrently available, or concurrently become available, for processing new packets. Burstiness in availability of packet processing nodes to accept new packets can result in under-utilization of packet processing nodes, for example when many processing nodes simultaneously become available to accept new packets. Inasmuch as the distributor is unable to sufficiently quickly distribute new packets to the packet processing nodes that are ready to initiate processing of the packets, increased idle time of the packet processing nodes will likely result, in some situations.

In an embodiment, groups of packet processing nodes are arranged in respective packet processing clusters, with each cluster comprising a subset of all of the packet processing nodes. The distributor selectively distributes packets to the packet processing clusters for processing of packets by the packet processing nodes located at the packet processing clusters. A respective prefetch buffer is associated with a corresponding packet processing cluster and is used for storing one or more packets distributed to the packet processing cluster when all packet processing nodes of the packet processing cluster are unavailable for processing of the packet, in an embodiment. In an embodiment, when a packet is received at a packet processing cluster when none of the packet processing nodes of the packet processing cluster are available to initiate processing of the packet, the packet is stored in the prefetch buffer associated with the packet processing cluster. In this way, the packet is "prefetched" by the packet processing cluster for subsequent processing of the packet by a packet processing node of the packet processing cluster, in an embodiment. When a packet processing node of the packet processing cluster becomes available for processing of the packet, the packet is retrieved from the prefetch buffer associated with the cluster and is provided to the available packet processing node in the cluster for processing of the packet. Prefetching of packets by packet processing clusters allows the packet to be provided to packet processing nodes that subsequently become available for processing of the packets more quickly compared to systems in which no prefetching of packets is performed, resulting in less idle time of the packet processing nodes and general increase in utilization of the packet processing nodes even in situations in which many packet processing nodes simultaneously become available to accept new packets, in at least some embodiments and/or scenarios. Reducing idle time of the PPNs 104 allows the network device 100 to process more packets during a given time and/or allows the network device 100 to achieve a given throughput using fewer PPNs 104, in at least some embodiments.

In some situations, prefetching a packet to a packet processing cluster for subsequent processing of the packet when a packet processing node of the packet processing cluster becomes available for processing of the packet may actually delay time of completion of processing of the packet. For example, if a packet is prefetched by a first packet processing cluster, and a packet processing node in a second packet processing cluster becomes available for processing of the packet relatively sooner than a packet processing node in the first packet processing cluster, in some situations. In an embodiment, delaying completion of processing of certain packets may result in higher degree of reordering of packets in a packet flow after completion of processing of the packets, as will be explained in more detail below, in some situations. In various embodiments, the distributor utilizes one or more distribution techniques and policies described herein to diminish or eliminate delays that may otherwise be caused by prefetching packets by packet processing clusters. Such distribution techniques and policies allow the distributor to ensure suitably low processing delays and suitably low reorder degree of processed packets, while decreasing, minimizing or eliminating idle times of packet processing nodes when packet processing nodes become available for processing new packets, in at least some embodiments and/or scenarios.

Figure 1:
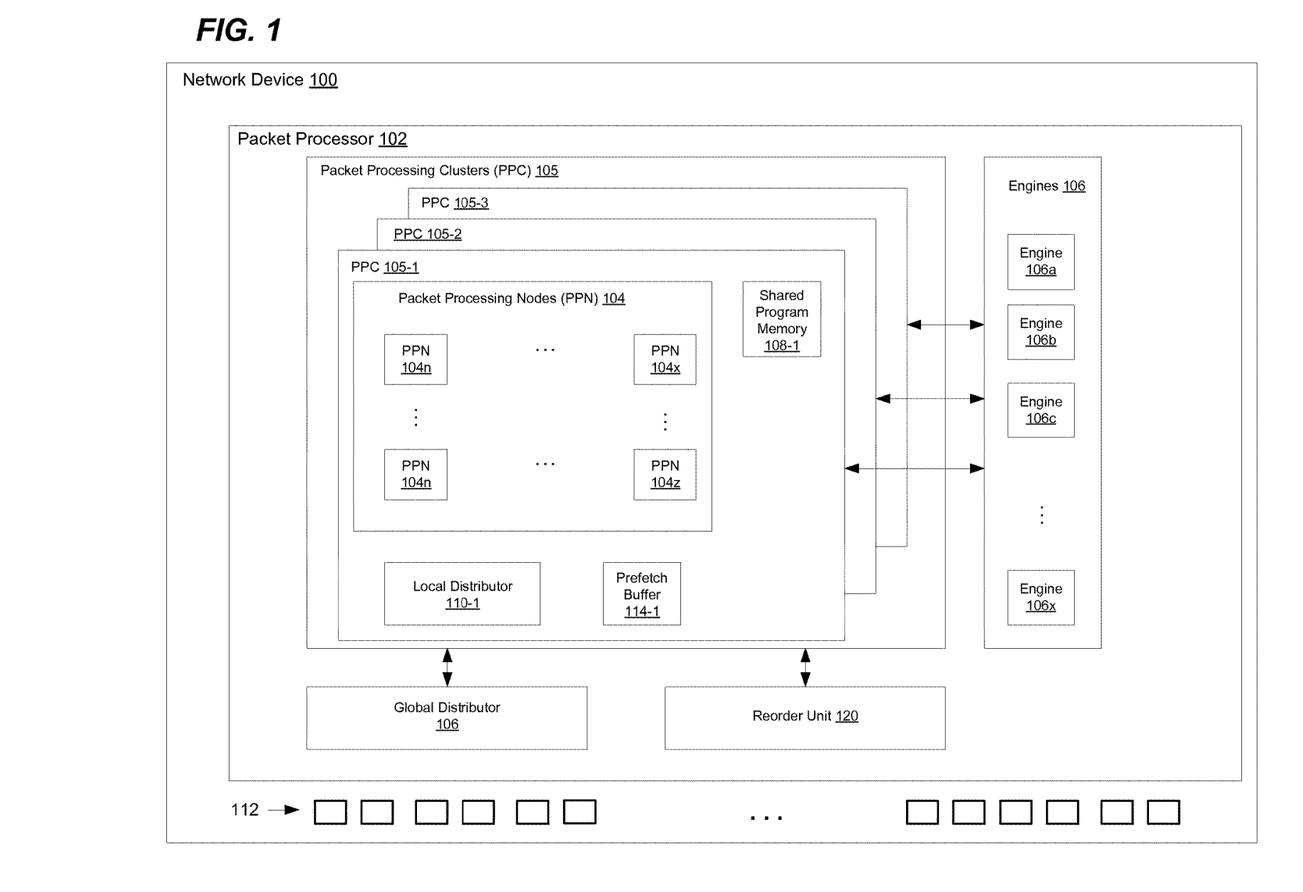
FIG. 1 is a simplified block diagram of an example network device configured to efficiently distribute processing of packets to a plurality of packet processing nodes configured to concurrently, in parallel, perform processing of packets, according to an embodiment.

FIG. 1 is a simplified block diagram of an example network device 100 configured to efficiently distribute the processing of packets to a plurality of packet processing nodes configured to concurrently, in parallel, perform processing of packets, according to an embodiment. The network device 100 is generally a computer networking device that connects two or more computer systems, network segments, subnets, and so on. For example, the network device 100 is a switch, in one embodiment. It is noted, however, that the network device 100 is not necessarily limited to a particular protocol layer or to a particular networking technology (e.g., Ethernet). For instance, the network device 100 could also be a bridge, a router, a VPN concentrator, etc.

The network device 100 includes a packet processor 102, and the packet processor 102, in turn, includes a plurality of packet processing nodes 104, arranged in a plurality of packet processing clusters 105. The network device 100 also includes a plurality of network ports 112 coupled to the packet processor 102, and each of the network ports 112 is coupled via a respective communication link (not seen in FIG. 1) to a communication network and/or to another suitable network device within a communication network. Packets received via the network ports 112 are provided for processing to the PPNs 104. Generally speaking, the PPNs 104 are configured to process packets received via ingress ports 112, to determine respective egress ports 112 via which the packets are to be transmitted, and to transmit the packets via the determined egress ports 112.

In an embodiment, the packet processor 102 employs two-level distribution hierarchy to distribute processing of packets received by the packet processor 102 to the PPNs 104 of the packet processor 102. The two-level distribution hierarchy employed by the packet processor 102 in an embodiment includes global distribution of packets that distributes packets to PCCs 105, and local distribution of packets at each of the PPCs 105 that locally distributes packets to PPNs 104 of the PPC 105. Referring still to FIG. 1, the packet processor 102 includes a global distributor 106 configured to distribute processing of packets, received via the ports 112, to the PPCs 105 for processing of the packet by packet processing nodes 104 of the PPCs 105. Each PPC 105 includes a local distributer 110 configured to distribute packets to available PPNs 104 of the PPC 105. The two level distribution system employed by the packet processor 102 generally simplifies interconnectivity needed for distribution of packets to PPNs 104 of the packet processor 102 by eliminating the need to provide individual connections between the global distributor 106 and each of the PPNs 104, in an embodiment.

In an embodiment, the packet processor 102 includes a plurality of prefetch buffers 114, each of the prefetch buffers 114 associated with a particular PPC 105, and coupled to the local distributor 110 of the particular PPC 105. In an embodiment, a prefetch buffer 114 associated with a PPC 105 is configured to store one or more packets distributed to the PPC 105 when processing of the packet cannot be immediately initiated by a PPN 104 of the PPC 105. In an embodiment, each of the prefetch buffers 114 is dedicated to storing one or more packets distributed to a particular PPC 105 to be processed by PPNs 104 of the particular PPC 105. In an embodiment, each of the prefetch buffers 114 is a separate memory device, such as a separate random access memory (RAM) memory device. In an embodiment, a prefetch buffer 114 associated with a PPC 105 is positioned in physical proximity with the local distributor 110 of the PPC 105 and the PPNs 104 of the PPC 105. In an embodiment, a prefetch buffer 114 associated with a PPC 105 is included in the local distributor 110 of the PPC 105. In another embodiment, at least some of the prefetch buffers 114 are portions of a single memory device, such as a RAM memory device, shared by multiple ones of the PPCs 105.

In an embodiment, when the local distributor 110 receives a packet provided to the PPC 105 by the global distributor 106 at a time when none of the PPNs 104 of the PPC 105 are available to initiate processing of the packet, the local distributor 110 temporarily places the packet in the prefetch buffer 114 associated with the PPC 105. Subsequently, when a packet processing node 104 of the packet processing cluster 105 becomes available for processing of the packet (e.g., when the PPN 104 completes processing of a previously received packet), the local distributor 110 retrieves the packet from the prefetch buffer 114 and provides the packet to the PPN 104 that is now available for processing of the packet. In this way, the packet is prefetched by the packet processing cluster 105, at a time when no packet processing nodes 104 of the packet processing cluster 105 are available for processing of the packet, for subsequent processing of the packet by a packet processing node 104 when one of the packet processing nodes 104 in the cluster becomes available for processing of the packet. Because the packet is prefetched in the prefetch buffer local to the packet processing cluster 105, and dedicated to storing packets for subsequent processing of the packets by packet processing nodes local to the packet processing cluster 105, the packet can be quickly and efficiently provided to the PPN 104 for processing of the packet when the PPN 104 becomes available for processing of the packet, thereby reducing or minimizing idle time of the PPN 104, in an embodiment.

In some embodiments, the packet processor 102 processes packet descriptors associated with the packets rather than processing the packets themselves. For example, when packets are received by the network device 100, the packets, or at least payload portions of the packets, are stored in a memory device, such as an ingress buffer (not shown in FIG. 1), and a packet descriptor associated with the packet is generated to be used for processing of the packet by the packet processor 102 of the network device 100. The packet descriptor includes some information from the packet, such as some or all of the header information of the packet, and/or includes information generated for the packet by the network device 100, in an embodiment. In some embodiments, the packet descriptor includes other information as well such as an address, a pointer, or other suitable indicator of a location in a memory device (e.g., in an ingress buffer) at which the associated packet is stored. In some embodiments, packet descriptors associated with packets, rather than the packets themselves, are provided to the global distributor 106, and the global distributor 106 distributes the packet descriptors to the packet processing clusters 105. Accordingly, the local distributors 110 receive packet descriptors associated with packets, rather than the packets themselves, and provide the packet descriptors to available PPNs 104, or temporarily store the packet descriptors in the prefetch buffers 114 for subsequent transmission to PPNs 104, in such embodiments. For ease of explanation, the term "packet" herein is used to refer to a packet itself or to a packet descriptor associated with the packet.

According to an embodiment, the PPNs 104 are programmable and as such configured to process packets using computer readable instructions stored in a non-transitory memory. For example, in an embodiment, each PPC 105 includes shared memory device, such as a non-transitory shared memory 108 that stores computer readable instructions and the PPNs 104 of the PPC 105 are configured to execute the computer readable operations stored in the shared memory 108. In another embodiment, at least some of the PPNs 104 are implemented using application-specific integrated circuits (ASICs) or other suitable hardware components.

In an embodiment, each PPN 104 is configured to perform all necessary processing (run to completion processing) of a packet. In another embodiment, each PPN 104 is configured to perform only a portion of processing of a packet. For example, although the packet processor 102 is illustrated in FIG. 1 as having the PPNs 104 arranged in a parallel configuration, in another embodiment the packet processor 102 includes a pipeline of PPNs 104, wherein a PPN 104 in the pipeline is configured to perform a portion of processing of a packet and to pass the packet to a next PPN 104 in the pipeline for performing another portion of processing of the packet. In some embodiments, during processing of the packets, the PPNs 104 engage external processing engines 106 for performing various specific processing operations with respect to the packets. In an embodiment, the external processing engines 106 are implemented using ASICs or other suitable hardware components, and each external processing engine 106 is dedicated to performing a single processing operation, typically a processing intensive operation such as an operation involving a table lookup, in an embodiment. As just an example, in an example embodiment, a first external processing engine 106 (e.g., the engine 106a) is a forwarding lookup engine, a second external processing engine 106 (e.g., the engine 106x) is a policy lookup engine, a third external processing engine 106 (e.g., the engine 106n) is a cyclic redundancy check (CRC) calculation engine, etc. The PPNs 104 are configured to utilize the results of the processing operations performed by the external processing engines 106 for further processing of the packets, for example to determine certain actions, such as forwarding actions, policy control actions, etc., to be taken with respect to the packets, in an embodiment.

Generally, after the PPNs 104 complete processing of a packets, the packet is transmitted via appropriate one or more ports 112 determined during processing of the packet. Typically, an order of data packets in a data flow needs to be maintained through a network device such that the order in which the packets are transmitted from the network device is the same as the order in which the packets were received by the network device 100. However, because processing of packets in a data flow is distributed among multiple ones of the PPNs 104, processing of the packets in the data flow is completed by the PPNs 104 in an order different than the order in which the packets were received by the network device, in at least some situations. Out of order completion of processing of the packets is due, for example, to variance in latency encountered by different PPNs 104 when accessing an external resource, such as external memory, for performing a lookup operation on a packet.

In an embodiment, the packet processor 102 includes a reordering unit 118 configured to maintain order of at least the packets belonging to a same data flow entering the network device 100, regardless of the packet processing node or nodes at which the packets are processed at the network device 100, to ensure that these packets are transmitted from the network device in the order in which the packets were received by the network device. As discusses above, in some embodiments, packets are prefetched to packet processing clusters 105 when none of the PPNs 104 of the packet processing clusters 105 are available for processing of the packets. Prefetching packets to the packet processing clusters 105 decreases or minimizes idle time of the packet processing nodes 104 when the PPNs 104 become available for processing of the packets compared to systems in which a packet is provided to a packet processing clusters only when at least one packet processing node of the packet processing cluster is idle and available to immediately begin processing of the packet. However, in some situations, prefetching packets to packet processing clusters may delay processing of some packets, and may further increase degree of reorder within a data flow that needs to be performed after completion of processing of the packets to maintain the order of the packets.

In some embodiments, the global distributor 106 is configured to implement one or more distribution policies described herein to reduce or eliminate processing delays caused by prefetching packets and/or to reduce degree of reorder needed to be performed on the packets. For example, as will be described in more detail below, in an embodiment, the global distributor 106 is configured to select PPCs 105 to which to distribute packets based on indications received from the PPCs 105 indicative of availability of packet processing nodes 104 of the PPCs 105 and/or indicative of availability of buffer space in prefetch buffers 110 of the PPCs 105. Further, to shorten the amount of time a packet is stored in a prefetch buffer of a PPC 105, the PPCs 105 are configured to mask indications indicative of buffer space availability at the PPC 105 until at least one PPN 104 of the PPC 105 is nearing completion of processing of the packet currently being processed by the PPN 104, in some embodiments.

Additionally, in some embodiments, the global distributor 106 is capable of distributing packets to PPCs 105 at a higher rate relative to the rate at which the packets are received by the global distributor 106. For example, in an embodiment, the global distributor 106 is configured with a higher output bandwidth relative to the input bandwidth of the global distributor 106. In an embodiment, the global distributor 106 stores packets received by the global distributor 106 in an input queue (not shown) when the packets cannot be immediately distributed to the PPCs 105, such as when none of the PPNs 104 of the PPCs 105 are available for processing the packets, or when insufficient numbers of PPNs 104 are available for processing of the packets. Subsequently, as PPNs 104 become available for processing of the packets stored in the input queue of the global distributor 106, the global distributor 106 distributes the packets to the PPCs 105 that have available PPNs 104 for processing of the packets, or that have available prefetch buffer space in which to store the packets, in an embodiment. Allowing the global distributor 106 to distribute packets to PPCs 105 at a higher rate relative to the rate at which the packets are received by the global distributor 106 generally reduces the average fill level of the input queue of the global distributor 106, in at least some embodiments.

Figure 2:
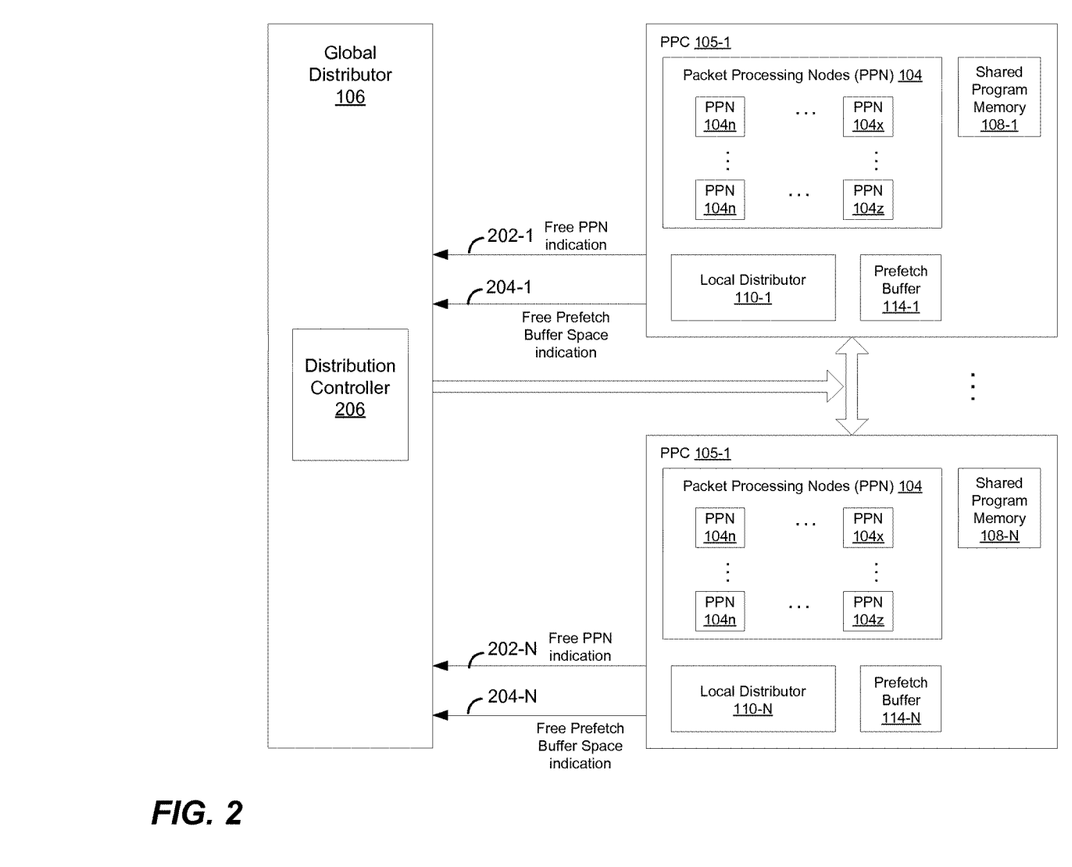
FIG. 2 is a block diagram illustrating interaction between a global distributor and a plurality of packet processing clusters of the network device of FIG. 1, according to an embodiment.

FIG. 2 is a block diagram illustrating interaction between the global distributor 106 and the plurality of packet processing clusters 105 of the network device 100 of FIG. 1, according to an embodiment. In the embodiment of FIG. 2, the global distributor module 106 receives respective available processor indications 222 and respective available buffer space indications 224 from each of the packet processing clusters 105. For example, the local distributors 110 of the PPCs 105 are configured to generate available processor indications 222 and/or the available buffer space indications 224, and to provide the generated available processor indications 222 and/or available buffer space indications 224 to the global distributor 106, in an embodiment. In an embodiment, when at least one PPN 104 of a packet processing cluster 105 is idle and available for processing new packets, the local distributor 110 of the PPC 105 generates the available processor indication 222 to indicate that the PPC 105 includes at least one PPN 104 available for processing new packets. Conversely, when none of the PPNs 104 of a PPC 105 are idle and available for processing of new packets, the local distributor 110 of the PPC 105 generates the available processor indication 222 to indicate to that the PPC 105 does not include any PPNs 104 available for processing new packets, in an embodiment.

In an embodiment, the local distributors 110 of the PPCs 105 are configured to generate available buffer space indications 224, and to provide the available buffer space indications 224 to the global distributor 106. In an embodiment, the local distributors 110 are configured to generate the available buffer space indications to indicate whether buffer space is available in the prefetch buffers 114 for storing packets when none of the PPNs 104 of the PPCs 105 are available for processing of the packets. For example, the buffer space indication 224 includes one bit set to a logic "one" to indicate that buffer space is available in the prefetch buffer 114 to store at least one packet and set to a logic "zero" to indicate that the prefetch buffer 114 does not have space available for storing a packet, or vice versa, in an embodiment. In other embodiments, the buffer space indication 224 includes other suitable numbers of bits. For example, a local distributor 110 of a PPC 105 generates the buffer space indication to indicate a fill level of the prefetch buffer 114 of the PPC 105, for example to indicate a number of packets that can currently be added to the prefetch buffer 105, in some embodiments.

The global distributor 106 is configured to receive the available processor indications 222 and/or the buffer space indications 224, and to select packet processing clusters 105 to which to distribute packets based on the available processor indications 222 and/or the buffer space indications 224, in some embodiments. In an embodiment, the global distributor 106 id configured to determine, based on the received one or both of (i) the available processor indications 222 and (ii) the buffer space indications 224, whether particular packet processing clusters are to be considered for selection of a packet processing cluster, of the plurality of packet processing clusters, to which to send a packet. In an embodiment, the global distributor 106 includes a distribution controller 206 configured to select a PPC 105 to which to send a packet based on one or both of (i) the respective available processor indications 222 and (ii) the respective buffer space indications 224. In an embodiment, the global distributor 106 employs a two level selection policy according to which the global distributor 106 selects a first PPC 105 from a first set of PPCs 105, the first set of PPCs 105 including PPCs 105 indicated as having available PPNs 104, and selects a second PPC 105 from a second set of PPCs 105, the second set of PPCs 105 including PPCs 105 indicated as having available buffer spaces in the prefetch buffers 114 of the PPCs 105. The global distributor 106 then selects the first PPC 105, selected from the first set of PPCs 105, or the second PPC 105, selected from the second set of PPCs 105, giving strict priority to the first set of PPCs 105. That is, in this embodiment, the global distributor 106 selects the first PPC 105, selected from the first set of PPCs 105, as long the first set of PPCs 105 is a non-empty set (i.e., includes a least one PPC 105). On the other hand, when the first set of PPCs 105 is an empty set, such as when none of the PPCs 105 include any PPNs 104 currently available for processing new packets, then the global distributor 106 selects the second PPC 105 selected from the second set of PPCs 105. In this case, when none of the PPCs 105 include any PPNs 104 currently available for processing new packets, the packet is sent to a PPC 105 that can buffer the packet in the prefetch buffer 110 associated with the PPC 105 until a PPN 104 of the PPC 105 becomes available for processing of the packet, in an embodiment.

Figure 3:
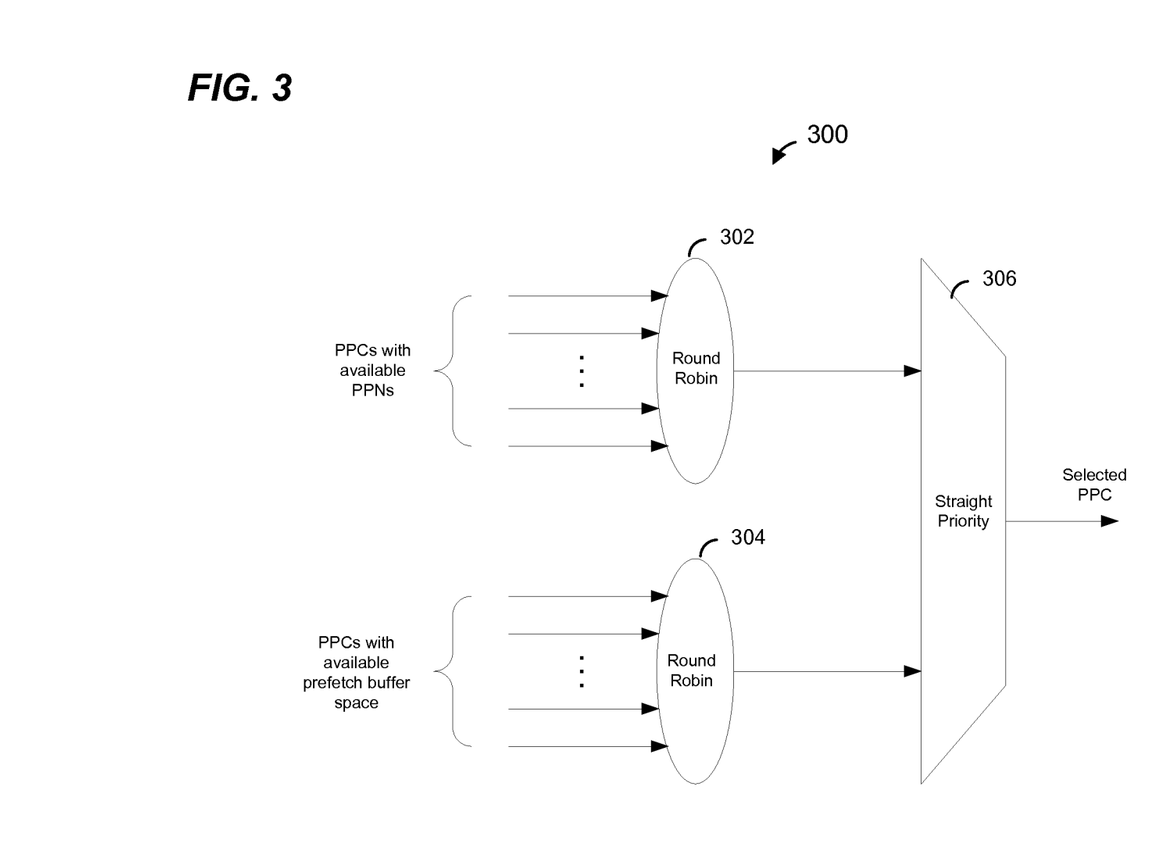
FIG. 3 is a block diagram of a selection system utilized with the global distributor of the global distributor of FIGS. 1 and 2 for selecting a packet processing cluster to which to distribute a new packet, according to an embodiment.

Referring briefly to FIG. 3, a selection system 300 is utilized with the global distributor 116 for selecting a PPC 105 to which to distribute a new packet, according to an embodiment. For example, in an embodiment, the selection system 300 is utilized as the distribution controller 205 of the global distributor 116. The selection system 300 includes a first selector 302 configured to select a PPC 105 from a first set of PPCs 105 and a second selector 304 configured to select a PPC 105 from a second set of PPCs 105. As discussed above, the first set of PPCs 105 includes PPCs 105 indicated as having available PPNs 104 for processing of new packets, in an embodiment, and the second set of PPCs 105 includes PPCs 105 indicated as having buffer space available for storing new packets for subsequent processing of the packets, in an embodiment. Each of the first selector 302 and the second selector 304 is a round robin selector that employs round robin selection to sequentially select a PPC 105 from the first set of PPCs 105 and the second set of PPCs 105, respectively, in an embodiment. In other embodiments, the first selector 302 and/or the second selector 304 employs a suitable selection technique other than round robin selection. For example, the first selector 302 and/or the second selector 304 employs random selection to randomly select a PPC 105 from the first set of PPCs 105 and the second set of PPCs 105, respectively, in an embodiment.

The first PPC 105 selected by the first selector 302 and the second PPC 105 selected by the second selector 304 are provided to a third selector 306. In an embodiment, the third selector 306 selects the first PPC 105 or the second PPC 105 as the PPC 105 selected by the selection system 300. In an embodiment, the third selector 306 is a strict priority selector that gives strict priority to the first set of PPCs 105. That is, in this embodiment, the third selector 306 selects the first PPC 105, selected by the first selector 302, when the first set of PPCs 105 is not a null set, i.e., when the first set of PPCs 105 includes at least one PPC 105. Accordingly, in this embodiment, when selecting a PPC 105 to which to send a new packets, the selection system 300 gives preference to PPCs 105 that are indicated as including PPNs 104 available for processing the packet. When none of the PPCs 105 are indicated as available to accept the new packet, the selector system 300 selects a PPC 105 that is able to buffer the new packet until a PPN 104 of the PPC 105 becomes available for processing of the new packet, in this embodiment.

Referring again to FIG. 2, in some embodiments, the local distributors 110 are configured to mask the buffer space indications 224 are configured to mask the buffer space indication 224 until at least one of the PPNs 104 of the PPC 105 has completed a predetermined portion of processing of the packet currently being processed by the PPN 104. For example, in an embodiment, each PPN 104 of a PPC 105, during processing of a packet, provides an indication to the local distributor 110 to indicate that the PPN 104 has completed a predetermined portion of processing of the packet currently being processed by the PPN 104. For example, each PPN 104 of a PPC 105 indicates to the local distributor 110 of the PPC 105 when the PPN 104 completed sixty percent of processing of the packet currently being processed by the PPN 104, seventy percent of processing of the packet currently being processed by the PPN 104, eighty percent of processing of the packet currently being processed by the PPN 104, or any other suitable portion of processing of the packet currently being processed by the PPN 104, in various embodiments.

In an embodiment, when all PPNs 104 of a PPC 105 are currently processing packets, the local distributor 110 of the PPC 105 does not indicate to the global distributor 106 that buffer space is available in the prefetch buffer 114 associated with the PPC 105 until at least one of the PPNs 104 of the PPC 105 indicates that the PPN 104 has completed a predetermined portion of processing of the packet currently being processed by the PPN 104. In other words, in this embodiment, the global distributor 110 generates the buffer space indication 224 to indicate that buffer space is available in the prefetch buffer 114 when (i) there is space available in the prefetch buffer 114 for storing a packet and (ii) at least one PPN 104 has indicated to the local distributor 110 that the PPN 104 has completed a predetermined portion of processing of the packet currently being processed by the PPN 104.

Accordingly, when all PPNs 104 of a PPC 105 are currently not available for processing new packets and there is space in the prefetch buffer 114 for prefetching a packet, the PPC 105 does not become available for selection by the global distributor 110 until at least one of the PPNs 104 is nearing completion of processing of the packet currently being processing by the PPN 104, in an embodiment. Because packets are not provided to a PPC 105 that currently does not have any PPNs 104 available for processing new packets until at least one PPN 104 is nearing a time of becoming available for processing new packets, the amount of time that packets are stored in prefetch buffers of the PPC 105 is generally decreased compared to systems in which buffer space availability is not masked, in at least some embodiments.

In another embodiment, the local distributor 106 is configured to provide to the global distributor 110 an indication of a number of PPNs 104 nearing completion of processing of the packets currently being processed by the PPNs 104, indicating to the global distributor 106 that the prefetch buffer 114 is available for storing the corresponding number of packets, provided that buffer space in the prefetch buffer 114 is available for storing the packets.

In yet another embodiment, the global distributor 106 is configured to implement a credit based system to account for (ii) packet processing nodes 104 of a PPC 105 available for processing new packets and/or (ii) buffer space available in respective prefetch buffers 114 associated with the PPCs 105. For example, the global distributor 106 is configured to maintain respective counters corresponding to PPCs 105, and to account for packet processing nodes 104 of a PPC 105 available for processing new packets and/or buffer space available in prefetch buffers 114 associated with the PPCs 105 by updating credits corresponding to packets stored in the prefetch buffers 114, in an embodiment. In an embodiment, each time the global distributor 106 selects a particular PPC 105 to which to send a packet, the global distributor 106 decrements a first counter corresponding to the PPC 105, the first counter used for accounting for available PPNs 104 at the PPC 105. Additionally or alternatively, in an embodiment, each time the global distributor 106 selects a particular PPC 105 to which to send a packet, the global distributor 106 decrements a second counter corresponding to the PPC 105, the second counter used for accounting for available buffer space in the prefetch buffer 114 associated with the PPC 105. Subsequently, when processing of the packet is completed by a PPN 104 of the PPC 105, or, alternatively, when the packet is retrieved from the prefetch buffer 114 of the PPC 105, the PPC 105 (e.g., the local distributor 110 of the PPC 105) indicates to the global distributor 106 that processing of the packet has been completed, or that the packet has been retrieved from the prefetch buffer 114 of the PPC 105. Upon receiving the indication from the PPC 105, the global distributor 106 increments first counter and/or the second counter corresponding to the PPC 105, in an embodiment. The credit system eliminates the need for the local distributors 110 of the PPCs 105 to provide available processor indications and/or available buffer space indications to the global distributor 106 and eliminates delay that may be associated with transmission of these indications from the PPC 105 to the global distributor 106 in some systems, in an embodiment.

Figure 4:
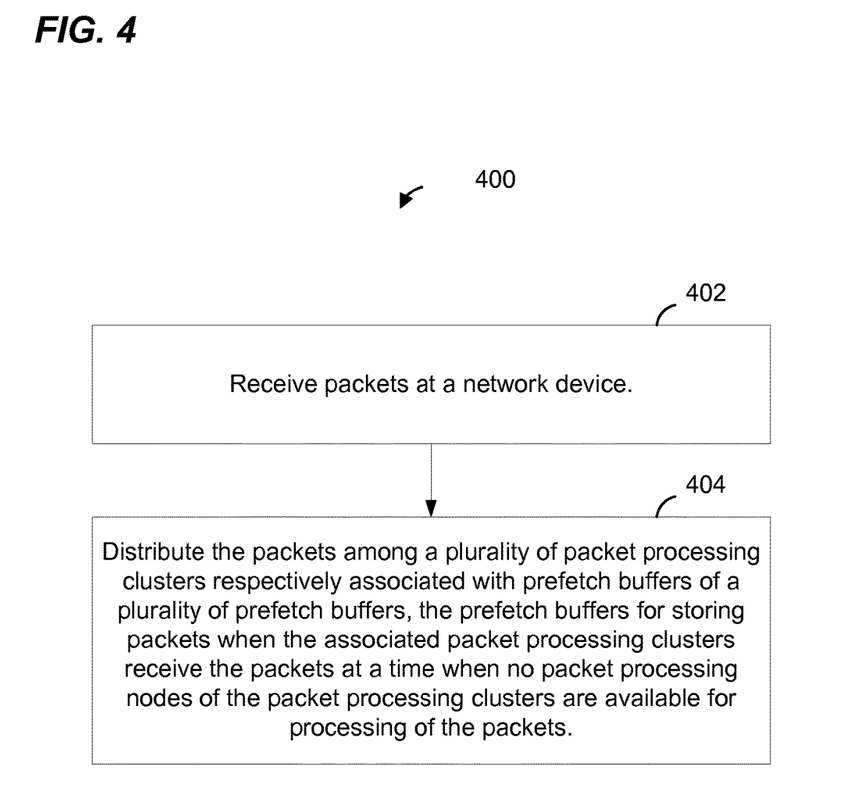
FIG. 4 is a flow diagram of an example method for processing packets in a network device, according to an embodiment.

FIG. 4 is a flow diagram of an example method 400 for processing packets in a network device, according to an embodiment. The method 400 is implemented by the network device 100 of FIG. 1, in an embodiment. In other embodiments, the method 400 is implemented by another suitable network device.

At block 402, packets are received at the network device. For example, referring to FIG. 1, packets are received at one or more of the ports 112 of the network device 100. At block 404, the packets received at block 402 are distributed among a plurality of packet processing clusters included in the network device. In an embodiment, the packet processing clusters are respectively associated with prefetch buffers of a plurality of prefetch buffers. In an embodiment, the prefetch buffers are for storing packets when a packet is distributed to a packet processing cluster at a time when none of packet processing nodes of the packet processing cluster are available for processing of the packet. In an embodiment, when a packet is received at a packet processing cluster at a time when none of the packet processing nodes of the packet processing cluster are available for processing of the packet, the packet is temporarily stored in a prefetch buffer associated with the packet processing cluster. Subsequently, when a packet processing node of the packet processing cluster becomes available for processing of the packet, the packet is retrieved from the prefetch buffer associated with the packet processing cluster and is provided to the packet processing node for processing of the packet, in an embodiment.

Figure 5:
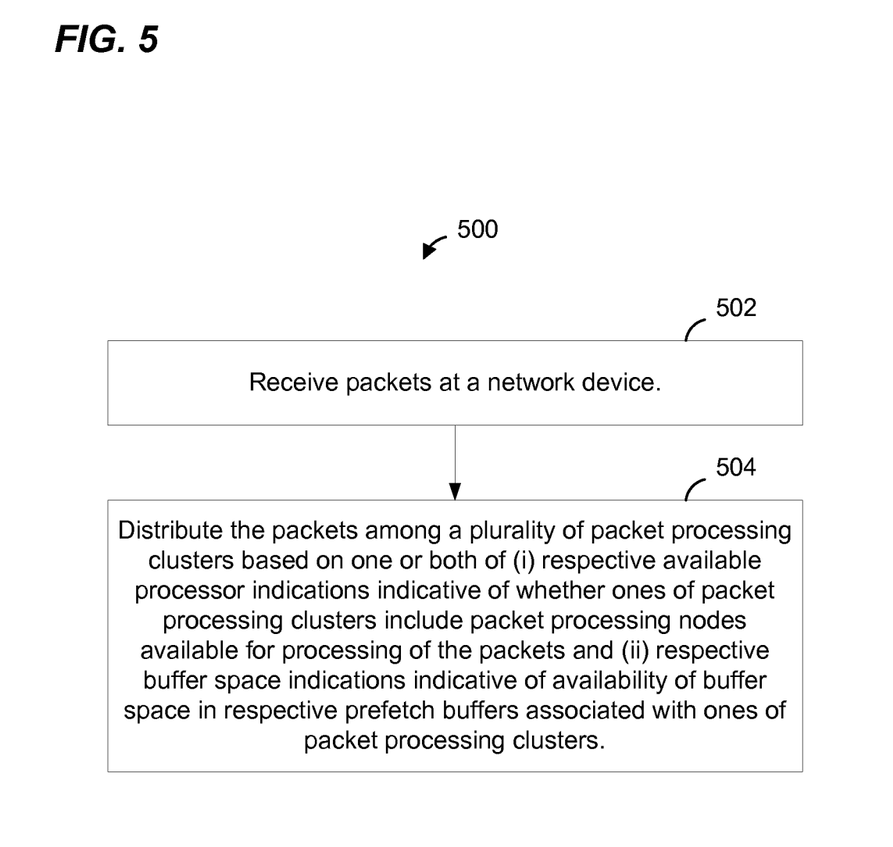
FIG. 5 is a flow diagram of another example method for processing packets in a network device, according to another embodiment

FIG. 5 is a flow diagram of an example method 500 for processing packets in a network device, according to an embodiment. The method 500 is implemented by the network device 100 of FIG. 1, in an embodiment. In other embodiments, the method 500 is implemented by another suitable network device.

At block 502, packets are received at the network device. For example, referring to FIG. 1, packets are received at one or more of the ports 112 of the network device 100. At block 504, the packets are distributed to packet processing clusters for processing of the packets by packet processing nodes of the packet processing clusters. In an embodiment, the packets are distributed at block 504 based on one or both of (i) respective available processor indications indicative of whether ones of packet processing clusters include packet processing nodes available for processing of the packets and (ii) respective buffer space indications indicative of availability of buffer space in prefetch buffers associated with the packet processing clusters.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A packet processing system, comprising:
a plurality of packet processing nodes configured to process packets and to determine respective egress ports via which the packets are to be transmitted, the packet processing nodes arranged in a plurality of packet processing clusters;
a plurality of prefetch buffers, ones of prefetch buffers respectively corresponding to different ones of the packet processing clusters, a first prefetch buffer corresponding to a first packet processing cluster and configured to store packets distributed to the first packet processing cluster for subsequent processing by one or more of the packet processing nodes of the first packet processing cluster before processing by any packet processing nodes of the first packet processing cluster and while packet processing nodes of the plurality of packet processing nodes of the first packet processing cluster are currently processing other packets;
a global distributor coupled to the plurality of packet processing clusters, the global distributor configured to selectively distribute a packet to one of the packet processing clusters for processing of the packet by one of a plurality of packet processing nodes included in the packet processing cluster to which the packet is distributed; and
a local distributor of the first packet processing cluster, the local distributor configured to distribute packets, received from the global distributor, to available packet processing nodes of the plurality of packet processing nodes of the first packet processing cluster and configured to cause a delay in distribution of the packets by the global distributor to the local distributor.

2. The packet processing system of claim 1, wherein the global distributor is further configured to
receive, from ones of the respective packet processing clusters one or both of (i) respective available processor indications indicative of whether the packet processing cluster includes packet processing nodes available for processing of the packets and (ii) respective buffer space indications indicative of availability of buffer space in the respective prefetch buffer corresponding to the packet processing cluster, and
selectively distribute the packets to one of the packet processing clusters based on the received one or both of respective available processor indications and respective buffer space indications.

3. The packet processing system of claim 1, wherein the local distributor is configured to:
generate a buffer space indication indicative of a fill level of the first prefetch buffer;
mask the fill level of the first prefetch buffer to cause the delay in the distribution of the packets by the global distributor to the local distributor until at least one of the packet processing nodes has completed a predetermined portion of processing of a packet currently being processed by the packet processing node; and
provide the buffer space indication to the global distributor.

4. The packet processing system of claim 1, wherein the local distributor is further configured to, while the packet processing nodes of the plurality of packet processing nodes of the first packet processing cluster are processing other packets:
store a packet distributed by the global distributor to the first packet processing cluster in the first prefetch buffer, and
when a packet processing node of the plurality of packet processing nodes of the first packet processing cluster becomes available for processing the packet,
retrieve the packet from the first prefetch buffer, and
provide the packet to the available processing node for processing of the packet.

5. The packet processing system of claim 1, wherein the local distributor is further configured to
generate one or both of (i) an available processor indication indicative of whether the first packet processing cluster includes a packet processing node, of the plurality of packet processing nodes of the first packet processing cluster, available for processing packets and (ii) a buffer space indication indicative of a fill level of the first prefetch buffer, and
provide the one or both of available processor indication and buffer space indication to the global distributor.

6. The packet processing system of claim 5, wherein the global distributor is configured to
receive, from the local distributor, the one or both of (i) the available processor indication and (ii) the buffer space indication, and
determine, based on the received one or both of (i) the available processor indication and (ii) the buffer space indication, whether the first packet processing cluster is to be considered for selection of a packet processing cluster, of the plurality of packet processing clusters, to which to send a packet.

7. The packet processing system of claim 5, wherein the local distributor is further configured to generate the buffer space indication to indicate a fill level of the first prefetch buffer.

8. The packet processing system of claim 5, wherein the local distributor is further configured to, when the plurality of packet processing nodes of the first packet processing cluster does not include any packet processing nodes available for processing packets, mask the fill level of the first buffer until at least one of the packet processing nodes has completed a predetermined portion of processing of a packet currently being processed by the packet processing node.

9. A method for processing packets in a network device, the method comprising:
receiving a plurality of packets, including at least a first packet, at an ingress port of the network device, wherein the network device includes a plurality of packet processing nodes configured to process the packets and determine respective egress ports via which the packets are to be transmitted, the packet processing nodes arranged in a plurality of packet processing clusters,
distributing, by a global distributor of the network device, the packets to the packet processing clusters for processing of the packets, including distributing the first packet to a first packet processing cluster of the plurality of packet processing clusters, wherein ones of the packet processing clusters respectively correspond to ones of a plurality of prefetch buffers, a first prefetch buffer corresponding to the first packet processing cluster and configured to store packets distributed to the first packet processing cluster for subsequent processing by one or more of the packet processing nodes of the first packet processing cluster before processing by any packet processing nodes of the first packet processing cluster and while packet processing nodes of the plurality of packet processing nodes of the first packet processing cluster are currently processing other packets, and causing, by a local distributor of the first packet processing cluster, a delay in distribution of the first packet by the global distributor to the first packet processing cluster.

10. The method of claim 9, further comprising
receiving the first packet at the local distributor of the first packet processing cluster,
distributing the first packet to a packet processing node included in the plurality of packet processing nodes of the first packet processing cluster, and
processing the packet using the packet processing node in the plurality of packet processing nodes of the first packet processing cluster.

11. The method of claim 10, wherein distributing the first packet to the packet processing node included in the plurality of packet processing nodes of the first packet processing cluster includes
when none of the packet processing nodes included in the plurality of packet processing nodes of the first packet processing cluster are available for processing of the first packet, storing the packet in the first prefetch buffer of the plurality of prefetch buffers, the first prefetch buffer corresponding to the first packet processing cluster, and
when a packet processing node of the plurality of packet processing nodes of the first packet processing cluster becomes available for processing the first packet, retrieving the first packet from the first prefetch buffer, and
providing the first packet to the packet processing node available for processing of the first packet.

12. The method of claim 11, further comprising
generating, by the local distributor, one or both of (i) an available processor indication indicative of whether the first packet processing cluster includes a packet processing node, of the plurality of packet processing nodes of the first packet processing cluster, available for processing packets and (ii) a buffer space indication indicative of a fill level of the first prefetch buffer, and
providing the one or both of (i) the available processor indication and (ii) the buffer space indication to the global distributor.

13. The method of claim 12, further comprising
receiving, at the global distributor from the local distributor, the one or both of (i) the available processor indication and (ii) the buffer space indication, and wherein
distributing the first packet includes determining, based on the received one or both of (i) the available processor indication and (ii) the buffer space indication, whether the first packet processing cluster is to be considered for selection of a packet processing cluster, of the plurality of packet processing clusters, to which to distribute the first packet.

14. The method of claim 12, further comprising generating the buffer space indication to indicate a fill level of the first prefetch buffer.

15. The method of claim 14, wherein generating the buffer space indication includes, when the first packet processing cluster does not include any packet processing nodes available for processing packets, masking the fill level of the first buffer until at least one of the packet processing nodes has completed a predetermined portion of processing of a packet currently being processed by the packet processing node.

16. The method of claim 9, further comprising
receiving, from respective packet processing clusters one or both of (i) respective available processor indications indicative of whether the packet processing clusters include packet processing nodes available for processing of the packets and (ii) respective buffer space indications indicative of availability of buffer space in respective prefetch buffers corresponding to ones of the packet processing clusters, and
wherein distributing the packets to the packet processing clusters includes selecting the packet processing clusters to which to distribute particular packets based on the one or both of respective the packets to the packet processing clusters based on the received one or both of respective available processor indications and respective buffer space indications.

17. A packet processing system, comprising:
a plurality of packet processing nodes configured to process packets and determine respective egress ports via which the packets are to be transmitted, the packet processing nodes arranged in a plurality of packet processing clusters,
a global distributor configured to distribute packets for processing to the packet processing clusters, the global distributor comprising a distribution controller configured to select packet processing clusters to which to distribute a packet based on one or both of (i) respective available processor indications indicative of whether ones of the packet processing clusters include packet processing nodes available for processing of the packet and (ii) respective buffer space indications indicative of availability of buffer space in respective prefetch buffers corresponding to ones of the packet processing clusters, and
a local distributor corresponding to a first packet processing cluster of the plurality of packet processing clusters and configured to cause a delay in distribution of packets by the global distributor to the first packet processing cluster;
wherein a first prefetch buffer corresponding to the first packet processing cluster is configured to store packets distributed for subsequent processing by one or more of the packet processing nodes of the first packet processing cluster before processing by any packet processing nodes of the first packet processing cluster and while packet processing nodes of the plurality of packet processing nodes of the first packet processing cluster are currently processing other packets.

18. The packet processing system of claim 17, wherein the packet processing system further comprises a local distributor associated with the first packet processing cluster, the local distributor configured to distribute packets, received from the global distributor, to available packet processing nodes of the plurality of packet processing nodes of the first packet processing cluster.

19. The packet processing system of claim 18, wherein the local distributor is further configured to, while the packet processing nodes of the plurality of packet processing nodes of the first packet processing cluster are currently processing other packets,
store the packet in the first prefetch buffer corresponding to the first packet processing cluster, and
when a packet processing node of the plurality of packet processing nodes of the first packet processing cluster becomes available for processing the packet,
retrieve the packet from the prefetch buffer, and provide the packet to the available processing node for processing of the packet.

20. The packet processing system of claim 19, wherein the local distributor is further configured to
generate one or both of (i) an available processor indication indicative of whether the first packet processing cluster includes any packet processing nodes, of the plurality of packet processing nodes of the first packet processing cluster, available for processing packets and (ii) a buffer space indication indicative of a fill level of the first prefetch buffer, and
provide the one or both of available processor indication and buffer space indication to the global distributor.

21. The packet processing system of claim 20, wherein the global distributor is configured to
receive, from the local distributor, the one or both of (i) the available processor indication and (ii) the buffer space indication, and
determine, based on the received one or both of (i) the available processor indication and (ii) the buffer space indication, whether the first packet processing cluster is to be considered for selection of a packet processing cluster, of the plurality of packet processing clusters, to which to send a packet.

22. The packet processing system of claim 20, wherein the local distributor is further configured to generate the buffer space indication to indicate a fill level of the first prefetch buffer.

23. The packet processing system of claim 20, wherein the local distributor is further configured to, when the plurality of packet processing nodes of the first packet processing cluster does not include any packet processing nodes available for processing packets, mask the fill level of the first buffer until at least one of the packet processing nodes has completed a predetermined portion of processing of a packet currently being processed by the packet processing node.

24. The packet processing system of claim 18, wherein the global distributor is further configured to:
account for one or both (i) available processors at respective ones of the packet processing clusters and (ii) available buffer space in respective prefetch buffers corresponding to ones of the packet processing clusters, and
generate one or both of (i) the respective available processor indications based on the accounting of available processors at the packet processing clusters and (ii) the respective buffer space indications based on the accounting of available buffer space in respective prefetch buffers corresponding to ones of the packet processing clusters.

25. A method for processing packets in a network device, the method comprising:
receiving packets at the network device, wherein the network device includes a plurality of packet processing nodes, the packet processing nodes arranged in a plurality of packet processing clusters, and
distributing the packets to the plurality of packet processing clusters for processing of the packets, including distributing the packets based on one or both of (i) respective available processor indications indicative of whether ones of the packet processing clusters include packet processing nodes available for processing of the packets and determination of respective egress ports via which the packets are to be transmitted and (ii) respective buffer space indications indicative of availability of buffer space in respective prefetch buffers corresponding to ones of the packet processing clusters;

wherein the plurality of packet processing clusters includes a first packet processing cluster, a first prefetch buffer corresponding to a first packet processing cluster and configured to store packets distributed to the first packet processing cluster for subsequent processing by one or more of the packet processing nodes of the first packet processing cluster before processing by any packet processing nodes of the first packet processing cluster and while packet processing nodes of the plurality of packet processing nodes of the first packet processing cluster are currently processing other packets;
wherein the method further comprises causing a delay in distribution of packets to the first packet processing cluster.

26. The method of claim 25, the method further comprising distributing, using a local distributor associated with the first packet processing cluster to available packet processing nodes of the plurality of packet processing nodes of the first packet processing cluster, packets distributed to the first packet processing cluster by the global distributor.

27. The method of claim 26, further comprising, while the packet processing nodes of the plurality of packet processing nodes of the first packet processing cluster are currently processing other packets,
storing a packet distributed by the global distributor to the first packet processing cluster in the first prefetch buffer corresponding to the first packet processing cluster, and
when a packet processing node of the plurality of packet processing nodes of the first packet processing cluster becomes available for processing the packet,
retrieving the packet from the first prefetch buffer, and
providing the packet to the available processing node for processing of the packet.

28. The method of claim 27, further comprising
generating, by the local distributor associated with the first packet processing cluster, one or both of (i) an available processor indication indicative of whether the first packet processing cluster includes any packet processing nodes, of the plurality of packet processing nodes of the first packet processing cluster, available for processing packets and (ii) a buffer space indication indicative of a fill level of the first prefetch buffer, and
providing the one or both of available processor indication and buffer space indication to the global distributor.

29. The method of claim 28, further comprising
receiving, at the global distributor from the local distributor associated with the first packet processing cluster, the one or both of (i) the available processor indication and (ii) the buffer space indication, and
determining, based on the received one or both of (i) the available processor indication and (ii) the buffer space indication, whether the first packet processing cluster is to be considered for selection of a packet processing cluster, of the plurality of packet processing clusters, to which to send a packet.

30. The method of claim 28, wherein generating the buffer space indication comprises generating the buffer space indication to indicate a fill level of the first prefetch buffer.

31. The method of claim 30, wherein generating the buffer space indication includes, while the plurality of packet processing nodes of the first packet processing cluster are currently processing other packets, masking the fill level of the first prefetch buffer until at least one of the packet processing nodes of the plurality of packet processing nodes of the first packet processing cluster has completed a predetermined portion of processing of a packet currently being processed by the packet processing node.

32. The method of claim 25, further comprising:
accounting for one or both (i) available processors at respective ones of the packet processing clusters and (ii) available buffer space in respective prefetch buffers corresponding to ones of the packet processing clusters, and generating one or both of (i) the respective available processor indications based on the accounting of available processors at the packet processing clusters and (ii) the respective buffer space indications based on the accounting of available buffer space in respective prefetch buffers associated with ones of the packet processing clusters.

\* \* \* \* \*